March 7, 1961 J. M. THORNBERY 2,973,672
TIMER
Filed June 30, 1959 6 Sheets-Sheet 1

INVENTOR.
JAMES M. THORNBERY
BY
*Bayard H. Michael*
ATTORNEY

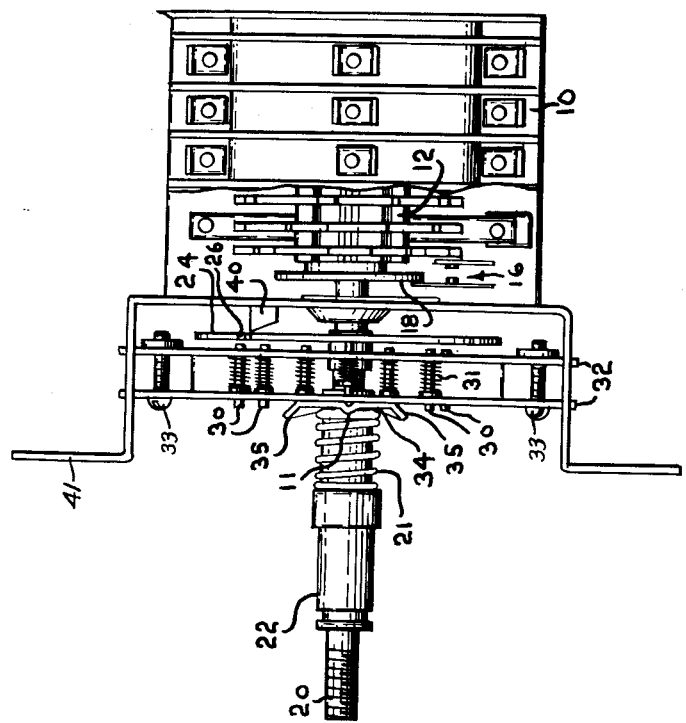
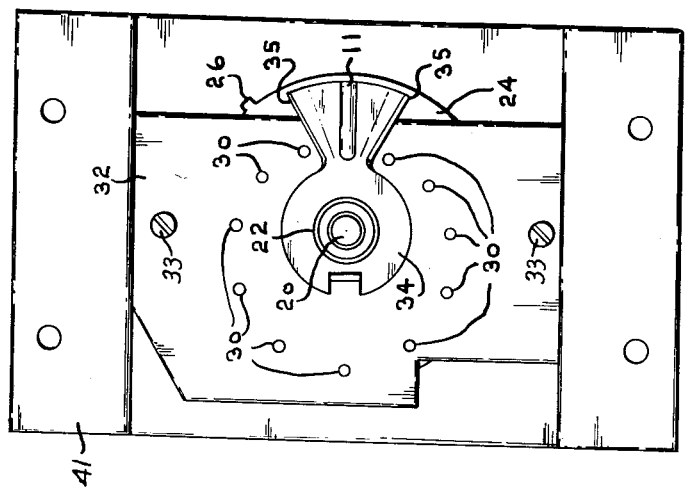

March 7, 1961 J. M. THORNBERY 2,973,672
TIMER
Filed June 30, 1959 6 Sheets-Sheet 3
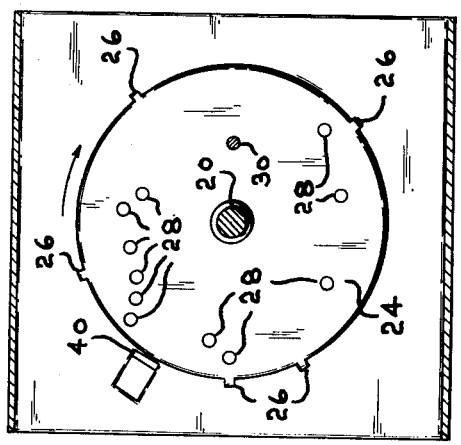
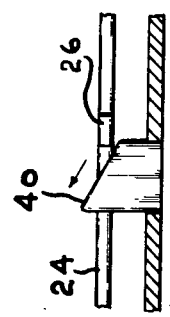
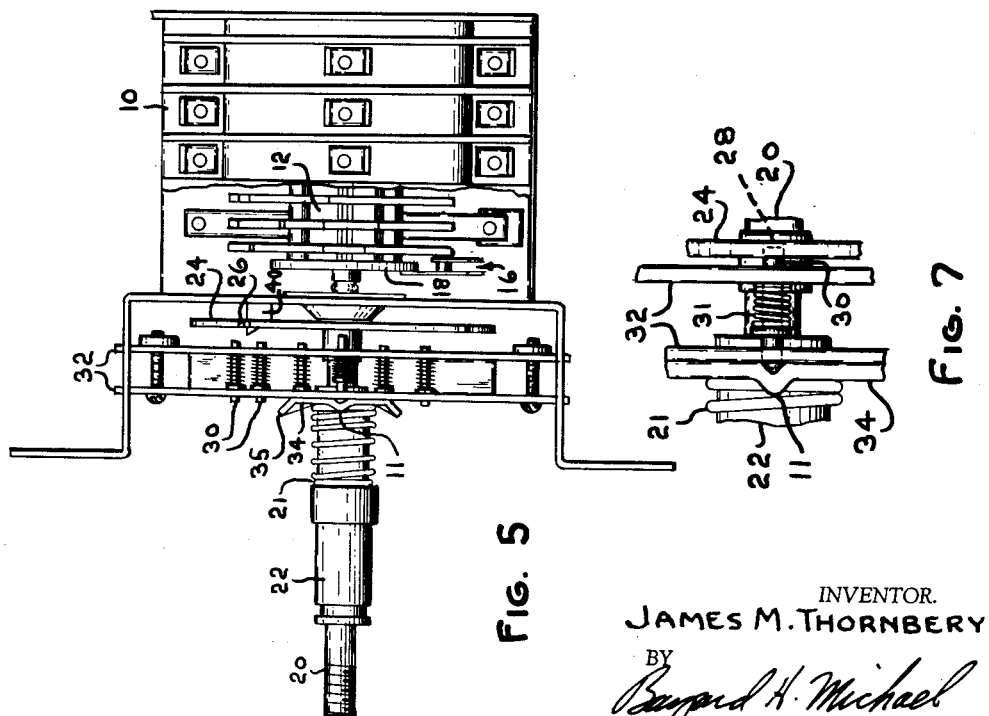
INVENTOR.
JAMES M. THORNBERY
BY
*Bayard H. Michael*
ATTORNEY March 7, 1961  J. M. THORNBERY  2,973,672
TIMER
Filed June 30, 1959  6 Sheets-Sheet 4

INVENTOR.
JAMES M. THORNBERY
BY
ATTORNEY

March 7, 1961

J. M. THORNBERY 2,973,672

TIMER

Filed June 30, 1959

INVENTOR.
JAMES M. THORNBERY
BY
ATTORNEY

March 7, 1961

J. M. THORNBERY 2,973,672

TIMER

Filed June 30, 1959

INVENTOR.
JAMES M. THORNBERY

ATTORNEY

United States Patent Office 2,973,672
Patented Mar. 7, 1961

2,973,672
TIMER

James M. Thornbery, Youngstown, Ohio, assignor to Controls Company of America, Schiller Park, Ill., a corporation of Delaware Filed June 30, 1959, Ser. No. 823,972

20 Claims. (Cl. 74—813)

This invention relates to timers and means for accurately positioning the timer at a desired starting period.

With the variations in fabrics, soil condition of clothes, etc., the washing machine manufacturers have been compelled to provide a variety of programs for the timer on the machine. Some fabric conditions and washing characteristics dictate an entirely different sequence of operations requiring basic program cycles while other fabric washing characteristics require only a portion of a basic program cycle and hence a plurality of starting positions for various fabric programs are required on the timer. Since a timer has basically 360 degrees in which it can operate without repeating, it has become necessary to crowd an ever increasing number of programs into the 360 degrees of rotation available. In order to carry out a particular program while maintaining a reasonable stepping action compatible with economic manufacture, the spacing between adjacent programs has been steadily decreased as the number of programs has increased. This has now resulted in a requirement that the timer be accurately positioned within close limits. This requirement is virtually beyond the ability of the user without some form of aid in locating the desired starting point.

The primary object of this invention is to provide a manually operated mechanism to aid in locating program starting points.

Other objects and advantages will be pointed out in or be apparent from the specification and claims as will obvious modifications of the embodiments shown in the drawings in which:

Figure 3 is similar to Figure 2 showing the pin selector in an alternate position.

Figure 4 is a side elevation partly in section.

Figure 5 is a side elevation partly in section with the line switch closed.

Figure 6 shows the control disc.

Figure 7 is a view of a pin pressed into engagement with the disc.

Figure 8 is a view of the line switch disconnect cam.

Figure 2:
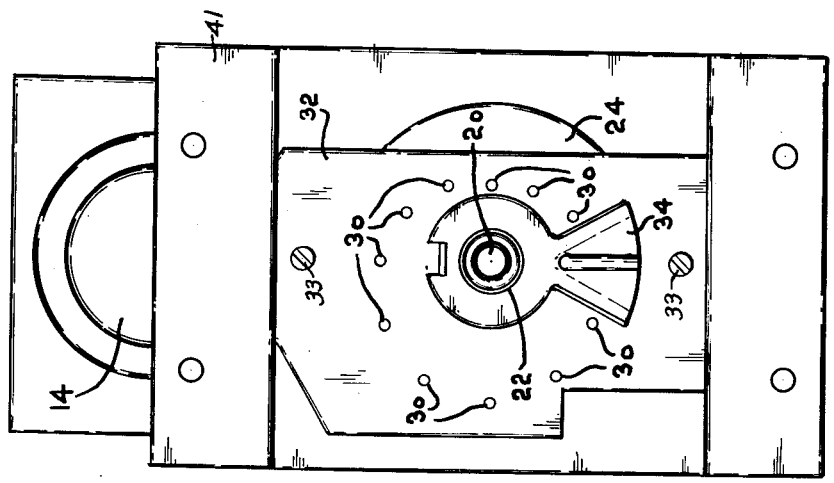
Figure 2 is a plan view of the pin selector.
Figure 1:
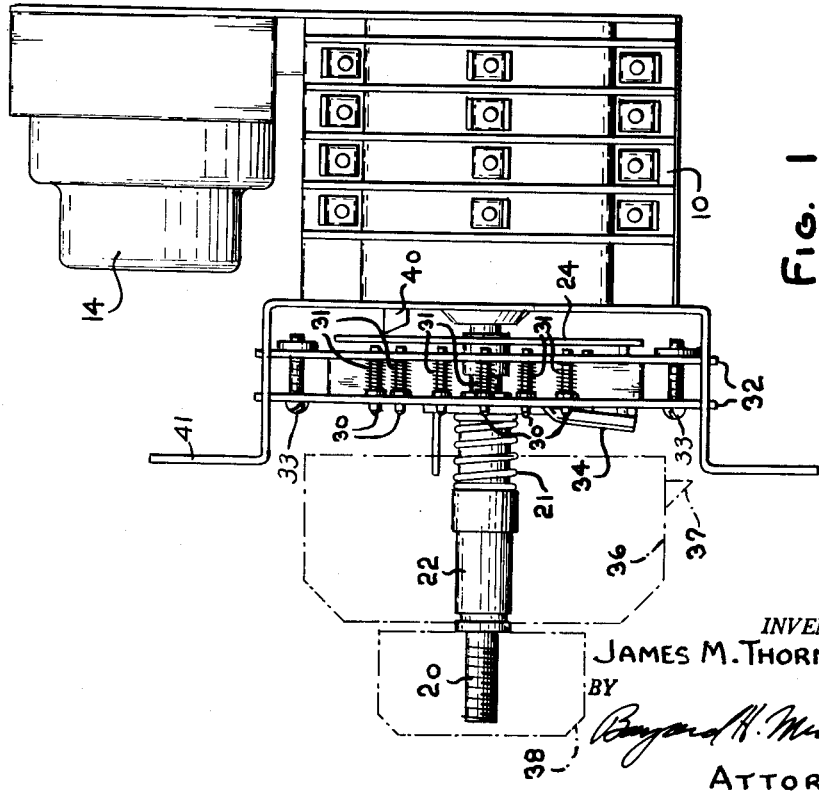
Figure 1 is a side elevation of the timer showing the present invention.

The timer generally comprises a pair of switch panels 10 positioned adjacent cam drum 12 which is driven by a synchronous motor 14 usually through a stepping drive but which may be driven through a creep drive. A shaft 20, coaxial with the cam drum, is rotatable within sleeve 22 and is splined to engage the drum while permitting axial motion. The shaft carries a cam 18 to actuate line switch 16 upon reciprocation of the shaft in the usual manner.

A disc 24 is secured to the shaft 20 and is provided with tabs or cam followers 26 on its outer periphery each located one step past the "off" intervals for each program. The disc has a number of holes 28 angularly and radially spaced about the disc which represent the starting points for the various cycles. The basic programs may be divided into a number of different programs represented by the number of holes spaced between each set of tabs on the disc. The disc is mounted to rotate with the shaft beneath a number of pins 30 that are mounted transversely to a pair of parallel plates 32 and are biased outwardly by springs 31 so that they project above the upper plate. Plates 32 project through slots provided in bracket 41 and are held against the section of the bracket located between the slots by bolts 33.

A selector 34 is mounted to rotate about sleeve 22 and is biased by spring 21 to ride on the upper surface of the plates, engaging the upper ends of the pins 30. The selector is provided with a pin depressing segment having upturned edges 35 to depress the pins as the segment is rotated about the sleeve. A knob 36 provided with a pointer 37 is attached to the selector and is mounted to rotate on the sleeve 22. The pointer cooperates with program indicia (not shown) located on the splash panel of the machine. The knob 36 and selector 34 are rotated until the pointer is aligned with a point on the program indicia. The exact position of the starting point is indicated by the detent action of one of the pins engaging groove 11 in the selector. The pins are angularly spaced about the sleeve so that the selector will depress only the pin in the groove. When a hole in the disc which corresponds to the depressed pin is aligned with that pin, the pin will be forced into the hole under the influence of spring 21 acting on the selector thereby preventing further rotation of the disc. It will be appreciated that rather than providing a hole in the disc, a finger or boss could be mounted on the surface of the disc to engage the pin. Holes are preferable because they require a less expensive manufacturing operation.

Knob 38 on the shaft 20 is then depressed pushing cam 18 toward switch 16 to close the line switch and start the timer. The disc will also be depressed so that it is free of the pin and will rotate with the drum. When the cycle selected has been completed, the disc will stop with one of the tabs adjacent stationary cam 40. If the knob 38 is again rotated the tab will ride up on the cam surface moving the shaft and cam upward to open the line switch 16, thus preventing rotation of the drum with the line switch closed. The disc will also rise so that the pin which has been previously depressed will again ride on the surface of the disc. Further rotation of the knob will rotate the disc until it is again aligned with the selected pin or with a new pin indicating the starting point for another cycle of operation.

Figure 9:
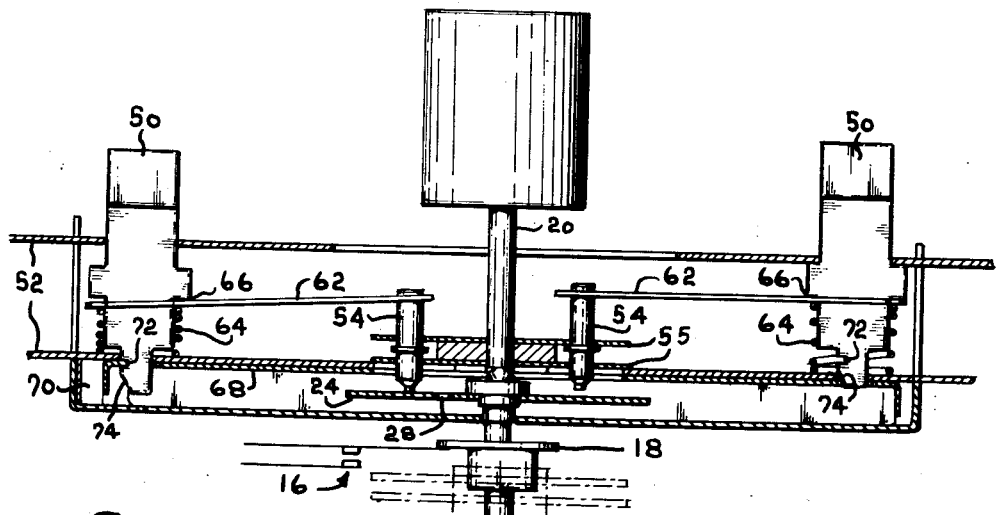
Figure 9 is a side elevation in section of a modified form of selector.
Figure 10:
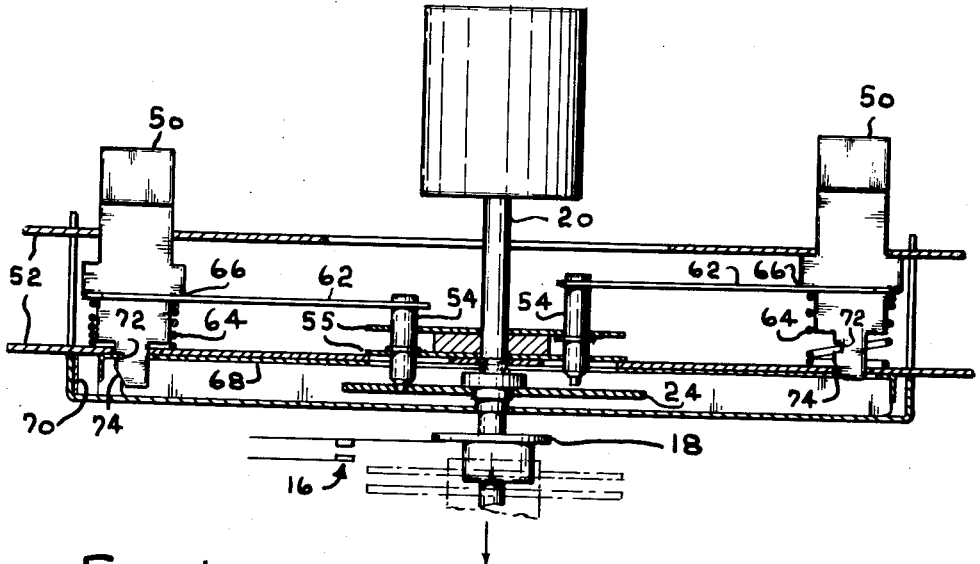
Figure 10 is similar to Figure 9 showing the pin engaging the control disc.
Figure 11:
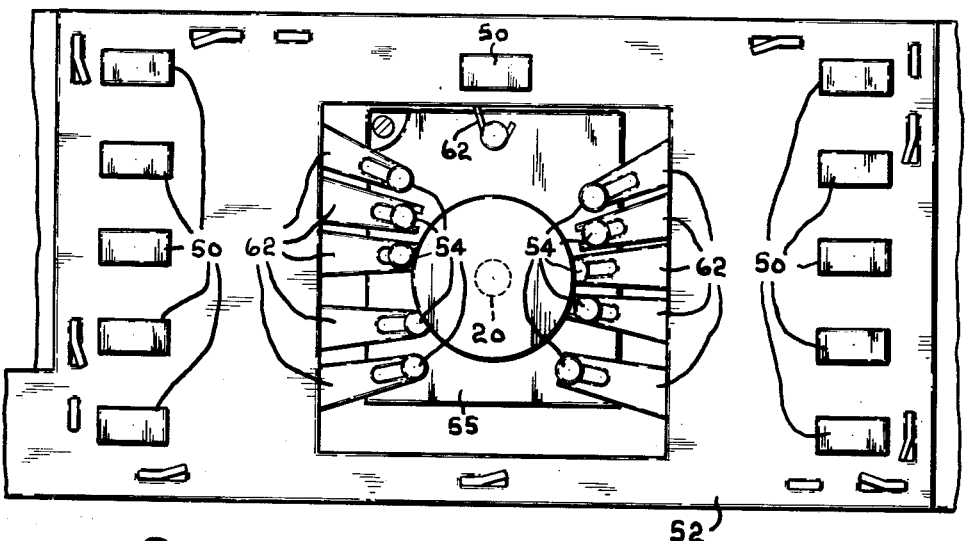
Figure 11 is a plan view of the modified selector.
Figure 12:
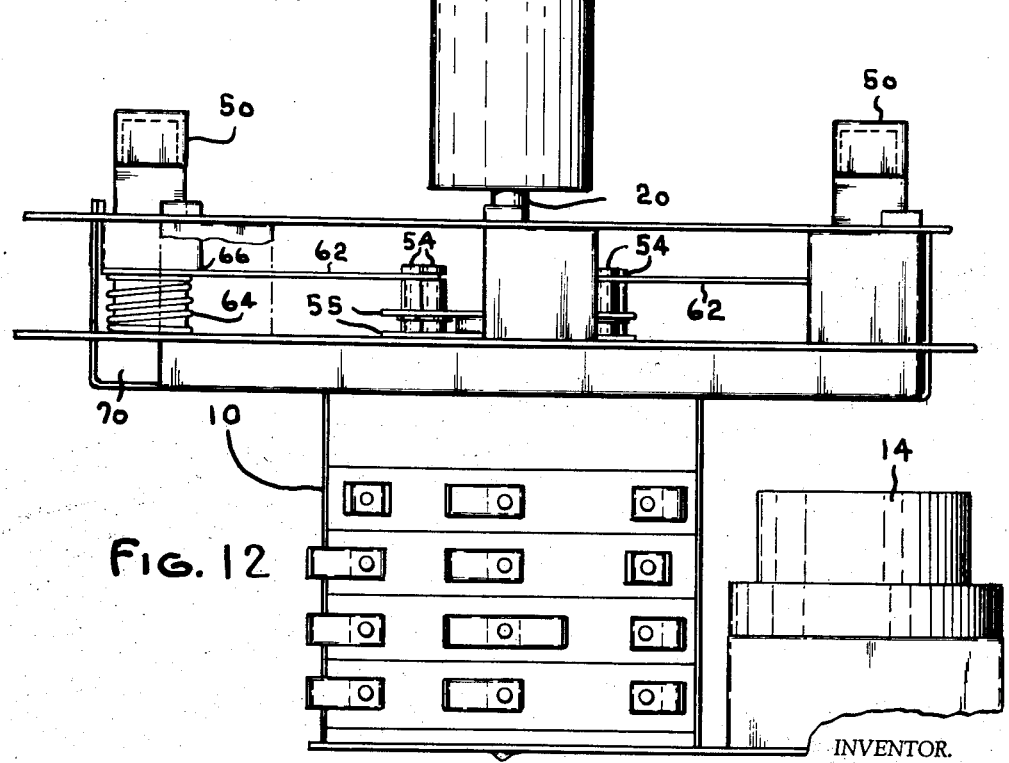
Figure 12 is a side elevation of the modified selector.
Figure 13:
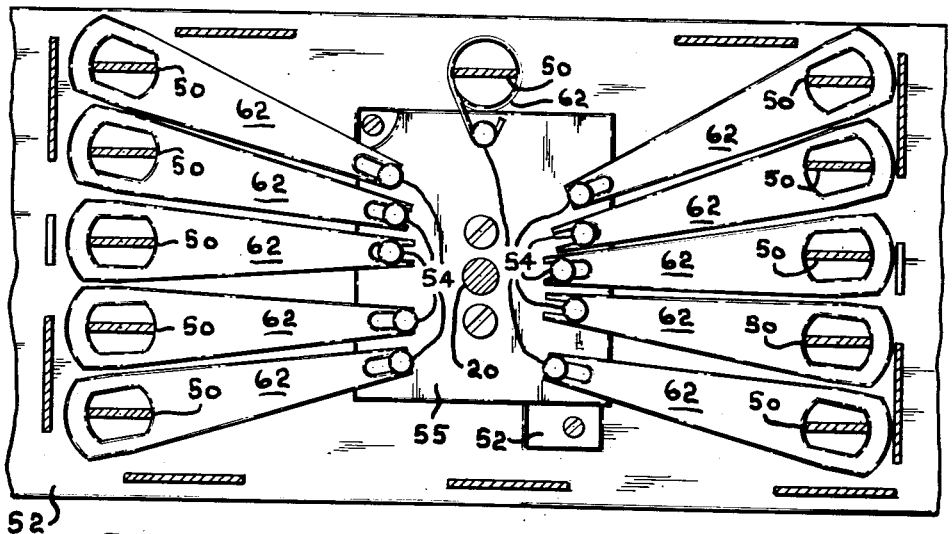
Figure 13 is a plan view partly in section of the modified selector.
Figure 14:
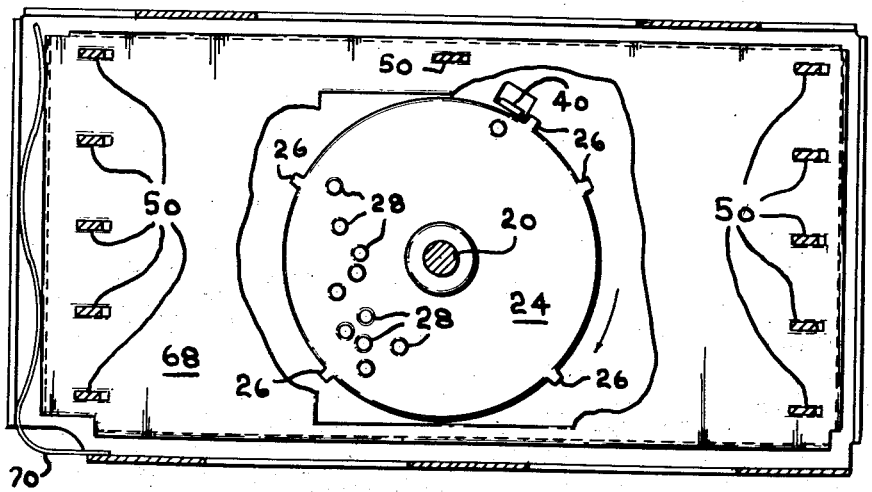
Figure 14 is a plan view in section showing the button return plate.

In the modified form shown in Figures 9 through 14, a push button arrangement is used to actuate the pins in place of the rotatable selector previously described. A plurality of buttons 50 are mounted transversely of a pair of plates 52, 52 and a plurality of pins 54 are mounted transversely of a pair of plates 55, 55. A disc 24 similar to that previously described is mounted to rotate with the shaft beneath the pins. The pins are depressed to engage the disc by means of the buttons and a connector 62 mounted on each button and engaging one of the pins. The buttons are biased outward by a spring 64 and when a button is depressed, the connector will force the pin connected thereto against the disc. The connector acts as a lever pivoted on the shoulder 66 of the button and is biased into engagement with the pin by spring 64. The connectors are made of spring steel and are flexed when the buttons are depressed increasing the bias on the pin. The pin will ride on the surface of the disc until the hole corresponding to the selected pin is aligned thereunder. The bias of the spring 64 and connector 62 will force the pin into the hole preventing further rotation of the disc.

The button is held down by a plate 68 which is biased by spring 70 to engage notch 72 in the lower end of the button. When another button is pressed for a different cycle, cam surface 74 on the lower end of the button will move plate 68 laterally, disengaging the previous button and then the plate will snap into notch 72 in the newly depressed button. When the shaft 20 is depressed the cam 18 will close the line switch 16 starting the motor. The disc will move axially with the shaft so that it is clear of the pin and can rotate.

At the end of the program selected the disc will stop with one of the tabs adjacent the cam as previously described. Rotation of the disc will move the disc outward opening the line switch and preventing rotation of the drum with the line switch closed.

Although but two embodiments of the present invention have been illustrated and described, it will be apparent to those skilled in the art that various changes and modifications may be made therein without departing from the spirit of the invention or from the scope of the appended claims.

I claim:

1. A means for locating a starting point on a timer comprising, a disc adapted to be rotated with the timer, a plurality of pins, means for movably supporting the pins adjacent the disc for movement towards and away from one face of said disc, means for selectively depressing one of the pins into engagement with the face of said disc to ride thereon, means for rotating the disc with relation to said pin and means on the disc to engage the depressed pin to prevent further rotation of the disc thereby stopping the disc at the selected starting point.

2. A means for locating a starting point according to claim 1 including means for disengaging the disc from the selected pin.

3. A means for locating a starting point on a timer comprising, a disc adapted to be rotated with the timer, said disc being provided with a plurality of holes angularly spaced about the disc, a plurality of pins respectively positioned for alignment with predetermined holes in the disc, means for supporting the pins for movement transverse to the plane of the disc, means for selectively biasing one of the pins into resilient engagement with the disc, means for rotating the disc relative to said pins so that the selected pin drops into the corresponding hole preventing further rotation of the disc and thereby stopping the disc at the selected starting point.

4. A means for locating a starting point according to claim 3 including means for disengaging the disc from the selected pin.

5. A means for locating a starting point on a timer comprising, a disc adapted to be rotated with the timer, said disc being provided with a plurality of holes angularly and radially spaced about the disc, a plurality of tabs located on the periphery of the disc, a plurality of pins, means for supporting the pins for movement transverse to the plane of the disc, means for selecting a program of operation for the timer and depressing one pin so that it is biased into engagement with the disc, means for rotating the disc relative to the pin so that the pin engages one of the holes preventing further rotation of the disc, means for disengaging the disc from the selected pin for rotation relative to the pin, and means for engaging one of the tabs after the selected program of operation has been completed to return the disc to the selecting position upon further rotation of the disc.

6. A device according to claim 5 wherein the selecting means includes a rotatable finger having a groove and a pair of dished edges and providing a positive indication of engagement with a pin through the detent action of the pin in the groove.

7. A device according to claim 5 wherein the selecting means includes a plurality of buttons operatively connected to the pins and to each other so that the depressing of one button and pin will disengage any other depressed button and pin.

8. A means for locating a starting point on a timer comprising, a disc adapted to be rotated with the timer and movable between a selecting position and an operating position, a plurality of tabs on the periphery of the disc indicating the "off" points for the basic cycles of operation of the timer, means for supporting a plurality of pins representing the starting points for the timer, means for selectively moving a pin into engagement with the disc while the latter is in the selecting position, means on the disc for engaging the pins, means for rotating the disc relative to said pins until the selected pin engages the pin engaging means, means for moving the disc to the operating position to disengage the disc from the depressed pin and means for engaging the tabs when the disc is rotated while in the operating position to move the disc from the operating position to the selecting position by rotation of the disc beyond the end of the selected cycle of operation as determined by the engagement of said tab and said tab-engaging means.

9. A device according to claim 8 wherein the selecting means comprises a finger rotatable on the axis of the disc to depress one pin at a time into engagement with the disc.

10. A device according to claim 8 wherein the selecting means comprises a plurality of buttons operatively connected to the pins.

11. A means for locating a starting point on a timer comprising, a disc adapted to be rotated with the timer, said disc being provided with a plurality of holes angularly and radially spaced about the disc, means supporting a plurality of pins adjacent the disc, a plurality of buttons operatively connected to corresponding pins so that the movement of a button will bias a pin into engagement with the disc, latching means releasably engaging the buttons so that the pressing of one button will release all other depressed buttons, means for rotating the disc so that the selected pin drops into the corresponding hole in the disc preventing further rotation of the disc.

12. A means for locating a starting point on a timer comprising, a disc adapted to be rotated with the timer, a plurality of pins, means for supporting the pins for movement transverse to the plane of the disc, means for selecting a program of operation for the timer, said selecting means biasing one of the pins into engagement with the disc, means for rotating the disc with respect to the pin, means angularly and radially spaced about the disc for engaging the selected pin and preventing rotation of the disc, and means for disengaging the disc from the selected pin for rotation relative thereto.

13. The combintion with a timer of the type having a motor rotated switching means to effect sequential operation of apparatus controlled thereby, of means for locating a starting point on the timer, comprising, a disc rotatable with a timer, a plurality of pins, means for supporting the pins adjacent the disc, means for selectively depressing one of the pins into engagement with the disc to ride on the surface of the disc when the disc is rotated with respect to the pins, and means on the disc to engage the selected pin to prevent further rotation of the disc thereby stopping the disc at the selected starting point.

14. The combination with a timer of the type having a motor rotated switching means to effect sequential operation of apparatus controlled thereby, of means for locating a starting point on the timer, comprising, a disc rotatable with the timer and having a plurality of holes angularly spaced about the disc, a plurality of pins respectively aligned with predetermined holes, means for supporting the pins for movement transverse to the plane of the disc, means for selectively biasing one of the pins into engagement with the disc, means for rotating the disc to align a selected pin with a predetermined hole whereupon said pin drops into said hole preventing further rotation of the disc when it has arrived at the selected starting point.

15. The combination with a timer of the type having a motor rotated switching means to effect sequential operation of apparatus controlled thereby, of means for locating a starting point on the timer, comprising, a disc rotatable with the timer, said disc being provided with a plurality of holes angularly and radially spaced about the disc, a plurality of tabs located on the periphery of the disc, a plurality of pins, means for supporting the pins for movement transverse to the plane of the disc, means for selecting a program of operation on the timer and depressing one pin so that it is biased into engagement with the disc, means for rotating the disc with respect to the pin to align a predetermined hole with said pin so that the pin enters said predetermined hole preventing further rotation of the disc, means for disengaging the disc from the selected pin and means on the timer for engaging one of the tabs after the selected program of operation has been completed, so that further rotation of the disc will return the disc to the selecting position.

16. The combination according to claim 15 wherein the selecting means includes a rotatable finger having a groove and a pair of dished edges and providing a positive indication of engagement with a pin through the detent action of the pin in the groove.

17. The combination according to claim 15 wherein the selecting means includes a plurality of buttons operatively connected to the pins and to each other so that depressing one button and pin will disengage any other depressed button and pin.

18. The combination with a timer of the type having a motor rotated switching means to effect sequential operation of apparatus controlled thereby, of means for locating a starting point on the timer, comprising, a disc rotatable with the timer and mounted for movement to a selecting position and to an operating position with respect to the timer, a plurality of tabs on the periphery of the disc indicating the "off" points for the basic cycles of operation of the timer, means for supporting a plurality of pins representing the starting points for the timer, means for selectively moving a pin into engagement with the disc while the latter is in the selecting position, means on the disc for engaging the pins, means for rotating the disc with respect to the pins until the selected pin engages a predetermined pin engaging means, means for moving the disc to the operating position to disengage the disc from the pin, means for engaging the tabs when the disc is in the operating position to move the disc from the operating position to the selecting position if the timer is rotated beyond the end of the selected cycle of operation.

19. The combination with a timer of the type having a motor rotated switching means to effect sequential operation of apparatus controlled thereby, of means for locating a starting point on the timer, comprising, a disc rotatable with the timer, said disc being provided with a plurality of holes angularly and radially spaced about the disc, means supporting a plurality of pins adjacent the disc for movement transversely of the plane of the disc, a plurality of buttons operatively connected to corresponding pins so that the movement of a button will bias a pin into engagement with the disc, latch means engaging the buttons to retain a depressed button in depressed position and to release all other depressed buttons, means for rotating the disc to align a predetermined hole with a selected depressed pin whereupon the selected pin drops into the aligned hole in the disc preventing further rotation of the disc.

20. The combination with a timer of the type having a motor rotated switch means to effect sequential operation of apparatus controlled thereby, of means for locating a starting point on the timer, comprising, a disc rotatable with the timer, a plurality of pins for movement, means for supporting the pins transverse to the plane of the disc, means for selecting a program of operation on the timer, said selecting means biasing one of the pins into engagement with the face of the disc, means for rotating the disc, means angularly and radially spaced about the disc for engaging the selected pin and preventing rotation of the disc, and means for disengaging the disc from the selected pin.

References Cited in the file of this patent

UNITED STATES PATENTS

| | | |
|---|---|---|
| 2,357,329 | Hansen | Sept. 5, 1944 |
| 2,438,045 | Gerhardt et al. | Mar. 16, 1948 |
| 2,561,187 | Elliott | July 17, 1951 |
| 2,585,018 | Kreitchman et al. | Feb. 12, 1952 |
| 2,820,186 | Kelling | Jan. 14, 1958 |

UNITED STATES PATENT OFFICE

CERTIFICATE OF CORRECTION

Patent No. 2,973,672                        March 7, 1961

James M. Thornbery

It is hereby certified that error appears in the above numbered patent requiring correction and that the said Letters Patent should read as corrected below.

Column 1, line 16, for "period" read -- point --; column 6, lines 35 and 36, strike out "for movement" and insert the same after "pins" in line 36; same column 6, line 40, after "disc" and before the comma insert -- with respect to the pins --.

Signed and sealed this 12th day of September 1961.

(SEAL)
Attest:

ERNEST W. SWIDER                        DAVID L. LADD
Attesting Officer                           Commissioner of Patents
                                                                                                    USCOMM-DC